United States Patent
Hashimoto et al.

(10) Patent No.: US 6,978,045 B1
(45) Date of Patent: Dec. 20, 2005

(54) IMAGE-PROCESSING APPARATUS

(75) Inventors: Keisuke Hashimoto, Toyokawa (JP); Yoshihiko Hirota, Toyokawa (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/408,366

(22) Filed: Sep. 29, 1999

(30) Foreign Application Priority Data

| | | | |
|---|---|---|---|
| Oct. 2, 1998 | (JP) | | 10-281001 |
| Oct. 2, 1998 | (JP) | | 10-281002 |
| Oct. 2, 1998 | (JP) | | 10-281027 |
| Oct. 2, 1998 | (JP) | | 10-281106 |

(51) Int. Cl.[7] ............................ G06K 9/48; G06K 9/40
(52) U.S. Cl. ..................... 382/199; 382/266
(58) Field of Search ............... 382/199, 205, 382/260, 261, 262, 263, 264, 265, 266, 267, 382/268, 269; 358/1.1, 465, 3.07; 345/611, 345/501, 506, 694; 356/394

(56) References Cited

U.S. PATENT DOCUMENTS

| | | | |
|---|---|---|---|
| 4,847,641 A | 7/1989 | Tung | 347/131 |
| 5,005,139 A | 4/1991 | Tung | 358/1.1 |
| 5,257,116 A | 10/1993 | Suzuki | 358/465 |
| 5,299,308 A * | 3/1994 | Suzuki et al. | 345/501 |
| 5,341,153 A * | 8/1994 | Benzschawel et al. | 345/694 |
| 5,486,927 A * | 1/1996 | Koizumi et al. | 358/3.07 |
| 5,559,530 A * | 9/1996 | Yamashita et al. | 345/611 |
| 5,862,257 A * | 1/1999 | Sekine et al. | 382/199 |
| 6,040,911 A * | 3/2000 | Nozaki et al. | 356/394 |
| 6,408,109 B1 * | 6/2002 | Silver et al. | 382/190 |
| 6,597,363 B1 * | 7/2003 | Duluk et al. | 345/506 |

OTHER PUBLICATIONS

Kurt Akeley, "Reality Engine Graphics", Aug. 1993, ACM, ISBN: 0-89791-601-8, pp. 109-116.*

* cited by examiner

Primary Examiner—Vikkram Bali
(74) Attorney, Agent, or Firm—Buchanan Ingersoll PC

(57) ABSTRACT

In an image processor on multi-level image data, an edge direction of a target pixel is discriminated from differences in density level between the target pixel and adjacent pixels thereof. A pixel is divided into a plurality of sub-pixels, and the image is formed in the unit of sub-pixels. The density level is set for each of the sub-pixels in the target pixel in accordance with the discrimination on the edge direction of the target pixel so that the center of gravity in density is changed in the target level. Then a character edge portion is reproduced more smoothly.

19 Claims, 22 Drawing Sheets

COMPARISON EXAMPLE

ORIGINAL IMAGE → IMAGE AFTER IMAGE PROCESSING

ORIGINAL IMAGE → IMAGE AFTER IMAGE PROCESSING

IMAGE-PROCESSING APPARATUS

This application is based on applications Nos. 10-281001, 10-281002, 10-281106 and 10-281027 filed in Japan, the contents of which are hereby incorporated by reference.

BACKGROUND OF THE INVENTION

1. Field of the Invention

The present invention relates to processing of digital image data, and more particularly to edge processing for character images.

2. Description of Prior Art

An image processor processes digital image data obtained by reading a document for printing. An image of the document is reproduced based upon the digital print data.

The image processor carries out various processes on the digital image data obtained in order to reproduce the image better. For reproduction of a character image in a character document, it is preferable to carry out edge emphasis on edge portions of characters. Therefore, various edge judgment methods and data emphasis methods based on the results of the edge judgment have been proposed.

In the case when a character image includes an edge oriented in a diagonal direction, after such an edge has been subjected to edge emphasis, the resulting image has jaggies. Consequently, the reproduced image is degraded on the image quality as compared with the original image. This is because the image is read and reproduced in the unit of pixel. It is desirable to reproduce the edge portions of characters more smoothly.

When an image is formed, it is proposed to divide a pixel into a plurality of sub-pixels in the main scan direction (for example, Japanese Patent laid-open Publication No. 9-240053/1997). This improves the resolution of the image, and fine expression of the image can be realized. In this case, smoothing is carried out on character edge portions by taking into account the gradation of adjacent pixels with respect to the gradation of a target pixel. Even in the case of a bi-level image, an image of multi-level gradation can be formed. Moreover, the center of gravity in density can be changed within the pixel by changing the density for each sub-pixel. However, the application of the smoothing on character edge portions raises a problem that fine lines in a multi-level gradation image have narrower line widths after the smoothing.

Another problem on the division of a pixel into a plurality of sub-pixels is that when input gradation data is bi-level data, the position of the center of gravity in density is always fixed. Therefore, even if the density is controlled in the unit of sub-pixel, it is not possible to obtain an advantage of smoothed edges.

SUMMARY OF THE INVENTION

An object of the present invention is to provide an image processor which can reproduce edge portions of characters more smoothly.

In one aspect of the invention, an image processor processes multi-level image data on density levels of pixels. A pixel is divided into a plurality of sub-pixels in the processing. In the image processor, an edge judgement circuit discriminates an edge direction of a target pixel from differences in density level between the target pixel and adjacent pixels thereof based upon the multi-level image data. Then, a density level determining circuit determines density levels in the sub-pixels in the target pixel in accordance with the density level of the target pixel and the discriminated edge direction of the target pixel. The digital image data is outputted in the unit of sub-pixels, and the density distribution (including the center of gravity in density) in the target pixel is controlled in the unit of sub-pixel. Thus, the resolution of the target pixel is improved, and the character edge portions are smoothly reproduced.

In a second aspect of the invention, the image processor further comprises a line width judgment circuit and a smoothing circuit. The line width judgment circuit determines a width of a line including the target pixel. The smoothing circuit performs smoothing on the image data of the target pixel and the adjacent pixels thereof in accordance to the determined line width and outputs the smoothed image data of the target pixel. Then, the density level determining circuit determines the density levels in the plurality of sub-pixels in the target pixel in accordance with the density level of the target pixel subjected to smoothing by the smoothing circuit and the edge direction of the target pixel discriminated by the edge judgment circuit.

In a third aspect of the invention, the image processor further comprises an edge judgment correction circuit connected to the edge judgment circuit and corrects the edge direction appropriately when the edge direction discriminated by the edge judgment circuit is not appropriate. That is, the edge direction is corrected if not appropriate.

In a fourth aspect of the invention, the image processor further comprises a smoothing circuit which performs smoothing on image data of the pixel, on which the edge judgment circuit discriminates an edge, by using an asymmetric filter having the target pixel at a center thereof. The density level determining circuit determines density level of each of the sub-pixels in the target pixel based on the density level of the image data of the target pixel smoothed by the smoothing circuit and on the edge direction of the target pixel.

An advantage of the invention is that character edge portions are reproduced smoothly.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
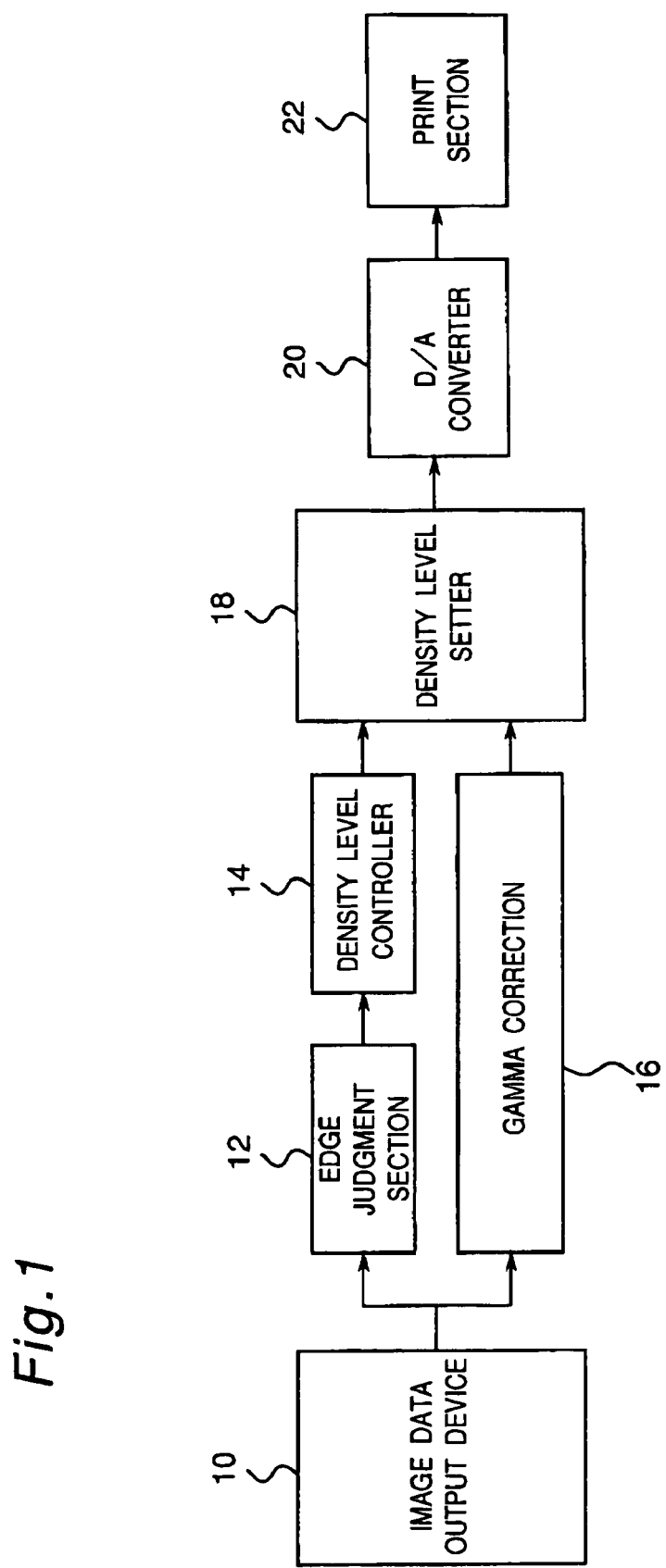
FIG. 1 is a block diagram of a first embodiment of an image processor.

Referring now to the drawings, wherein like reference characters designate like or corresponding parts throughout the several views, embodiments of the invention will be explained below. FIG. 1 shows an image processor of a first embodiment of the present invention. The image processor receives digital image data received from an image reader, a host computer or the like and generates digital image data for printing for exposing the photoconductor to form an image on a photoconductor. In the generation of the digital image data, it determines gradation difference between a target pixel and each of the adjacent pixels and discriminates an edge direction in the main scan direction according to the combination of the gradation differences. Then, it changes the center of gravity of the density distribution in the target pixel in accordance with the edge direction discriminated so as to smoothly reproduce the edge. Here, in order to change the center of the gravity in the density distribution in a pixel, which is a unit of image reading, a pixel is divided into a plurality of sub-pixels in the main scan direction. The density level to be applied to the target pixel is changed in the unit of sub-pixel so as to control the density distribution in the target pixel.

More specifically, in the image processor, an image-data output device 10 outputs the digital image data received from an image reader, a host computer or the like (not shown). In this example, the image data are outputted as gradation data consisting of eight bits per pixel. An edge judgment section 12 determines the difference in gradation between a target pixel and each of the adjacent pixels thereof by using the gradation data outputted from the image-data output device 10 so as to discriminate an edge direction in the main scan direction according to the combination of the differences in gradation. Then, based upon the judgement of the edge judgment section 12, a density level controller 14 generates a parameter signal for controlling the center of gravity in density in the pixel in the unit of sub-pixel obtained by dividing the target pixel in the main scan direction. On the other hand, a gamma correction section 16 subjects the gradation data received from the image data output device 10 to non-linear conversion so as to correct the non-linear curvature in the gradation property in a print section 22. Next, a density level setter 18 controls the density level for the data corrected by the gamma correction section 16, by using the density control parameter signals generated by the density level controller section 14 so as to change the center of gravity in density in the pixel. Thus, the density is controlled by the density level controller section 14 and the density level setter 18 in the unit of sub-pixel, and the data corrected by the gamma correction section 16 are converted to density levels (or digital gradation data) for printing in the unit of sub-pixel. A digital-to-analog (D/A) converter 20 converts a digital gradation data obtained by the density level setter 18 to an analog signal and outputs it to a laser driver in the print section 22. The print section 22 modulates the intensity of a laser beam in the unit of sub-pixel in accordance with the input signal. Thus a half-tone image is formed on a recording medium in raster scan.

The edge judgment section 12 discriminates the edge direction in the main scan direction of the target pixel by using the following four classifications. Based upon the results of this judgment, it is decided which direction the edge should be oriented in. The main scan direction is set in the lateral direction. "Right edge" refers to an edge on the right side of a character, that is, an edge where a character is located on the left side of the target pixel. "Left edge" refers to an edge on the left side of a character, that is, an edge where a character section is located on the right side of the target pixel. Moreover, "narrow edge" refers to an edge in a case that a character section is located in the center of the target pixel, that is, a case in which two edges, right and left edges, are located within a single target pixel. Here, the other cases that do not correspond to any of the above-mentioned cases are referred to as "non-edge".

Figure 2:
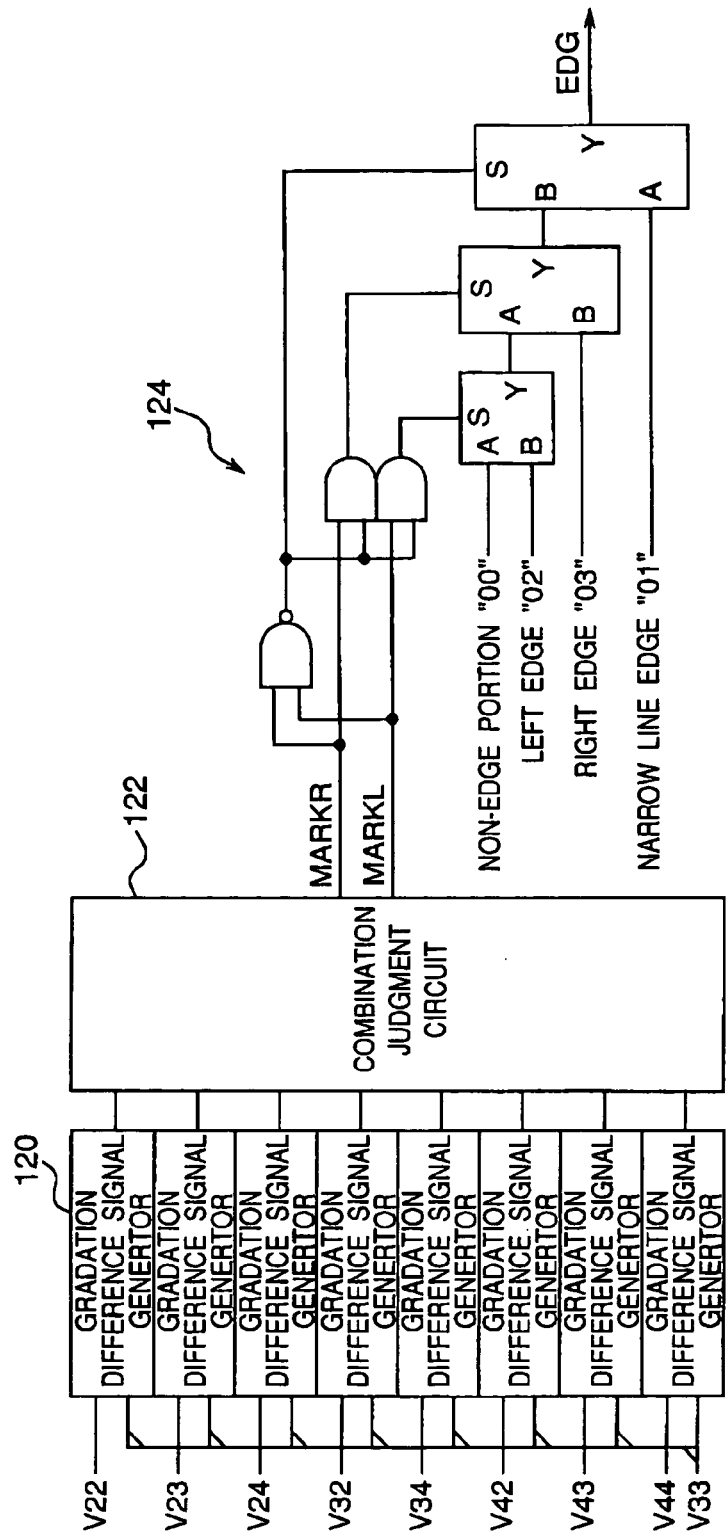
FIG. 2 is a block diagram of an edge judgment section.
Figures 3, 4:
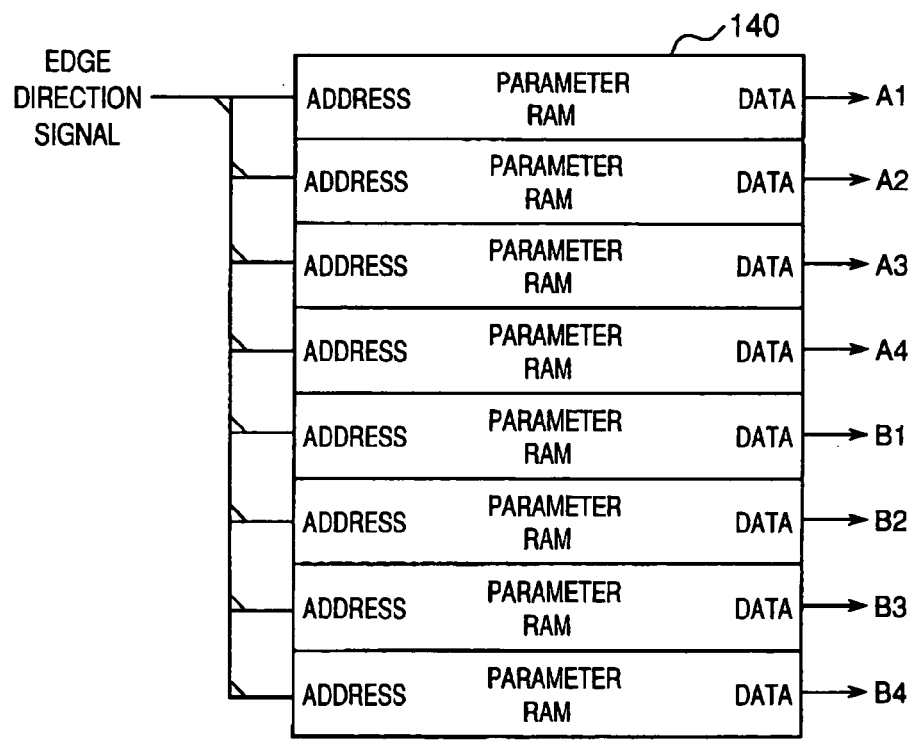
FIG. 3 is a diagram of a distribution of nine pixel signals used for edge judgement.
FIG. 4 is a block diagram of a density level controller section.

FIG. 2 shows a block diagram of the edge judgment section 12. An edge is judged by using, for example, a 3*3 pixel matrix. First, differences in gradation between a target pixel and each of the eight adjacent pixels thereof are calculated, and the pixels are classified into those having densities higher than the target pixel and those having densities lower than the target pixel. As shown in FIG. 3, in the 3*3 pixel matrix, V33 represents gradation data of the target pixel, and V22, V23, V24, V32, V34, V42, V43 and V44 respectively represent gradation data of the 8 pixels adjacent to the target pixel. In the edge judgment section 12, eight gradation difference signal generators 120 receive the gradation data V33 of the target pixel and the gradation data V22, V23, V24, V32, V34, V42, V43 and V44 of the eight adjacent pixels as inputs, to determine the differences in gradation data (gradation difference signals) between the target pixel and each of the adjacent pixels. A combination judgment circuit 122 receives gradation differences between the target pixel and the adjacent pixels as inputs, to discriminate the edge direction based upon the combination of the eight gradation differences. Thus, the differences in gradation between the target pixel and each of the eight adjacent pixels are calculated, and the pixels are classified to those having densities higher than the target pixel and those having densities lower than the target pixel. Then, the edge direction is discriminated based upon the relationship of density values between the target pixel and the adjacent pixels. More specifically, the combination judgment circuit 122 discriminates the edge direction (right edge, left edge, etc.) in the main scan direction based upon the combination of the eight gradation difference signals, to generate a right edge signal MARKR and a left edge signal MARKL. The right edge signal MARKR represents that there is a right edge, and the left edge signal MARKL represents that there is a left edge. Moreover, a logical circuit 124 including an NAND gate, two AND gates and three selectors (which selects A when S=L) discriminates the edge direction from the right edge signal MARKR and the left edge signal MARKL, to output an edge direction signal EDG. In other words, if both MARKR and MARKL are outputted, EDG= "01"(narrow edge), if either MARKR or MARKL is outputted, EDG="03" (right edge) or EDG="02" (left edge), and neither MARKR nor MARKL is outputted, EDG="00" (non-edge).

FIG. 4 is a block diagram of the density level controller 14. The edge direction signal EDG, an output from the edge judgment section 12, is received as an address signal, and eight density control parameter signals A1, A2, A3, A4, B1, B2, B3 and B4 are outputted from tables in eight parameter RAMs 140. The resulting density control parameters are sent to the density level setter 18.

Figure 5:
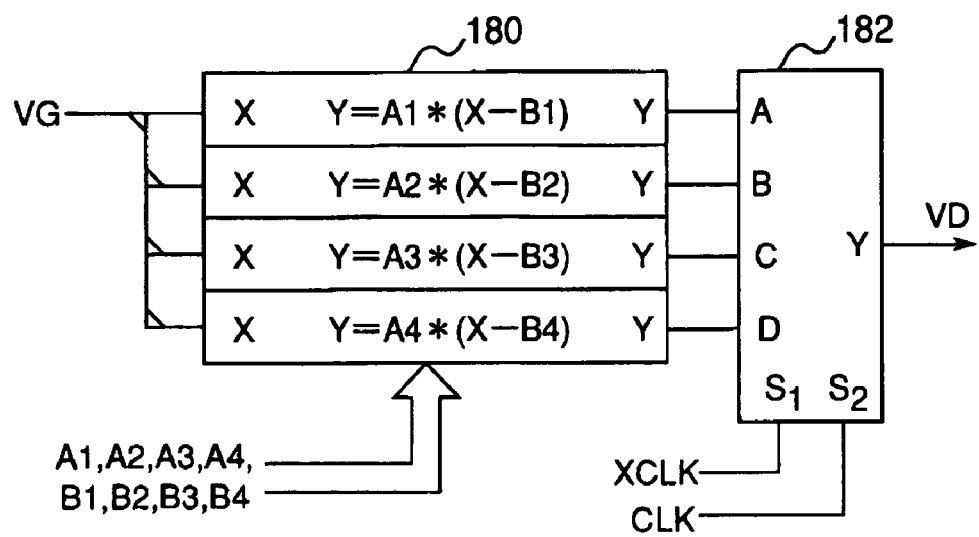
FIG. 5 is a block diagram of a density level setter.

FIG. 5 is a block diagram of the density level setter 18. In four density level calculators 180, a linear calculation, VH=A*(VG−B), as shown in the blocks therein, is respectively carried out for the gradation data VG obtained from the non-linear conversion at the gamma correction section 16, by using four kinds of combinations of the density control parameter signals, A1 and B1, A2 and B2, A3 and B3, and A4 and B4. As a result, four gradation signals VH1, VH2, VH3 and VH4 are obtained from VG. Next, a selector 182 switches the four gradation signals VH1, VH2, VH3 and VH4 for each sub-pixel in a pixel, obtained in the linear calculations in the density level calculation section 180, by using a pixel clock signal CLK and a double-speed clock signal XCLK having a frequency that is twice that of the pixel clock. Thus, a signal VD is generated. In this manner, one pixel is divided into four sub-pixels, and the digital gradation data VD is outputted for each sub-pixel.

FIGS. 6 to 9 show how the density in a pixel is changed for each kind of edge discriminated by the edge judgment section 12. These diagrams show how the digital gradation data to be given to each of the four sub-pixels in a pixel is changed with increase in the gradation in gradation data subjected to the non-linear conversion in the gamma correction section 16. In the diagrams, the height of a black portion in each sub-pixel represents the density level.

Figure 6:
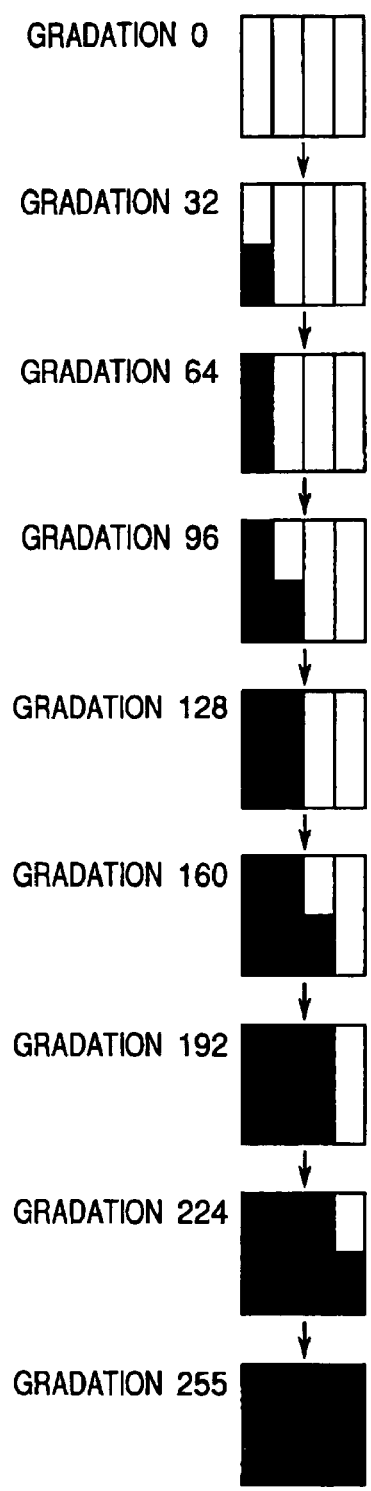
FIG. 6 is a diagram that shows changes in density with respect to the gradation level in the case of a right edge.

FIG. 6 shows density variation in the case of a right edge. Here, the density control parameters are as follows: A1=A2=A3=A4=4, B1=0, B2=64, B3=128, and B4=192. FIG. 6 shows cases in which the gradation levels are 0, 32, 64, 96, 128, 160, 192, 224, and 255. As shown clearly, for the right edge, the density is increased successively from the sub-pixel on the left side. Thus, the center of gravity in density of the pixel is shifted from left to the center successively.

Figure 7:
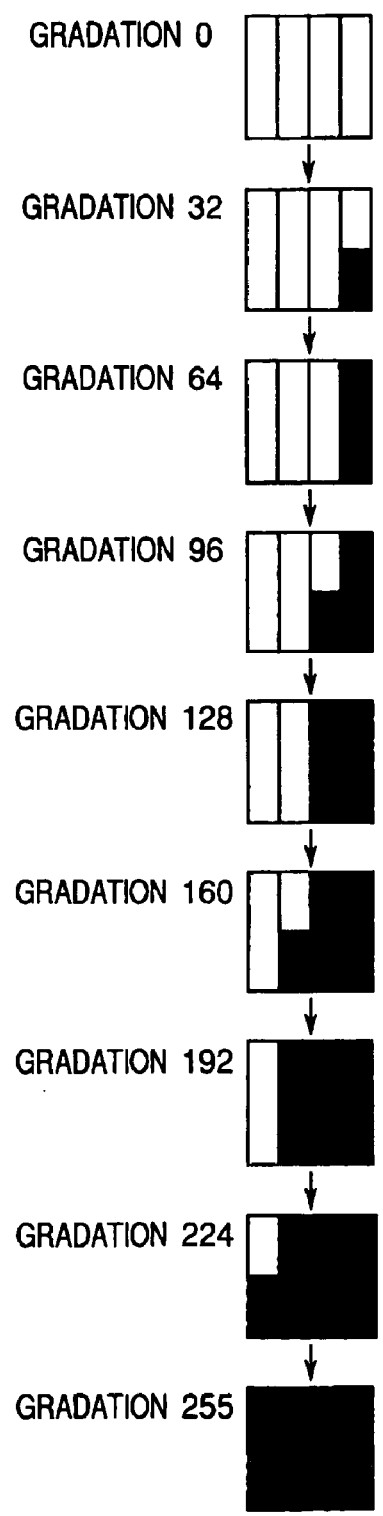
FIG. 7 is a diagram that shows changes in density with respect to the gradation level in the case of a left edge.

FIG. 7 shows density variation in the case of a left edge. This case is symmetrical with the case of the right edge shown in FIG. 6, with respect to the left and right sides. Here, the density control parameters are as follows: A1=A2=A3=A4=4, B1=192, B2=128, B3= 64, and B4=0. FIG. 7 shows cases in which the gradation levels are 0, 32, 64, 96, 128, 160, 192, 224, and 255. As shown clearly, for the left edge, the density is increased successively from the sub-pixel on the right side. Thus, the center of gravity in density of the pixel is shifted from right to the center successively.

Figure 8:
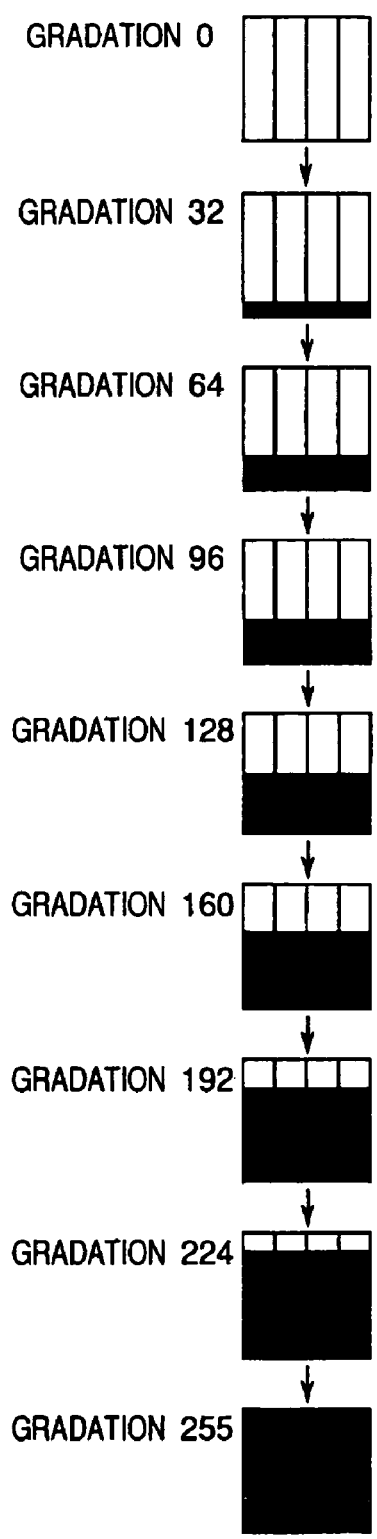
FIG. 8 is a diagram that shows changes in density with respect to the gradation level in the case of a non-edge portion.

FIG. 8 shows density variation in the case of a non-edge. Here, the density control parameters are as follows: A1=A2=A3=A4=1, and B1=B2=B3=B4=0. FIG. 8 shows cases in which the gradation levels are 0, 32, 64, 96, 128, 160, 192, 224, and 255. As shown clearly, since no edge exists, the four sub-pixels have the same density. Therefore, the center of gravity in density of the pixel is always located in the center. The density is increased with the gradation level.

Figure 9:
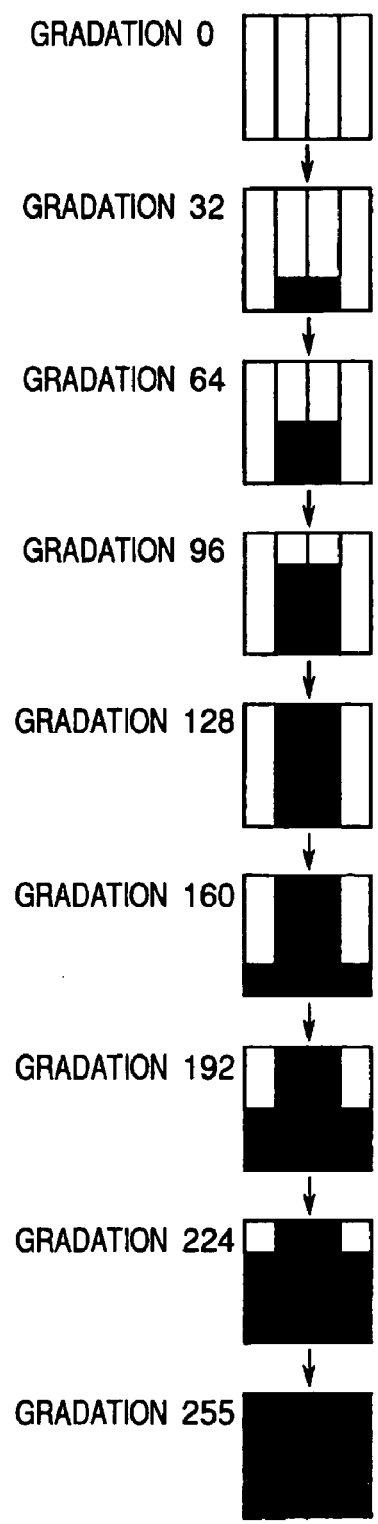
FIG. 9 is a diagram that shows changes in density with respect to the gradation level in the case of a narrow edge.

FIG. 9 shows density variation in the case of a narrow edge. Here, the density control parameters are as follows: A1=A2=A3=A4=2, B1=128, B2=B3=0, and B4=128. FIG. 9 shows cases in which the gradation levels are 0, 32, 64, 96, 128, 160, 192, 224, and 255. As shown clearly, for the narrow edge having a right edge and a left edge in a pixel at the same time, the densities of the two sub-pixels in the center are increased with the gradation level. The center of gravity in density of the pixel is always located in the center. Next, the densities of the two sub-pixels on both sides are increased with the gradation level. The center of gravity in density of the pixel is always located in the center. However, when the gradation level exceeds 128, the density distribution gradually expands to the right and left.

In FIGS. 6 to 9, the variations of the center of gravity in density is explained mainly. As shown in FIG. 9, the density is not necessarily increased from an edge in a target pixel. Moreover, not only the center of gravity but also the density distribution is changed.

Figure 10:
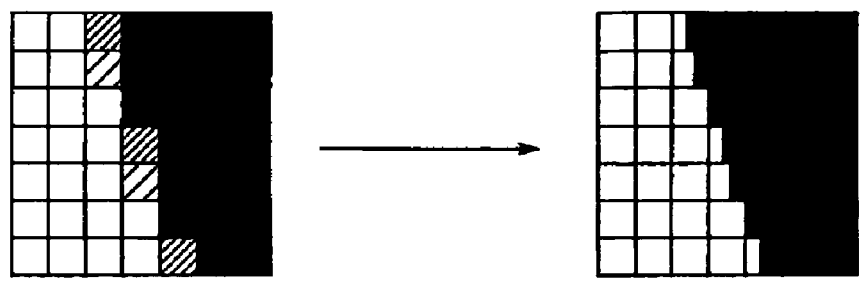
FIG. 10 is a diagram on actual image data after the process.

FIG. 10 shows schematically what effects can be obtained when applied to an actual image. Image data received from an image reader contains half-tone portions at edge portions on the left side in a diagonal line, as shown with hatching. This edge is a left edge. By using the half-tone density levels, the edge direction is detected, and the density is controlled in the unit of sub-pixel, so that the center of gravity in density is changed in the pixel at the edge portion. As a result, as shown on the right side, the edge is reproduced at higher resolution, and the image has the smoothly changing edge.

Figure 11:
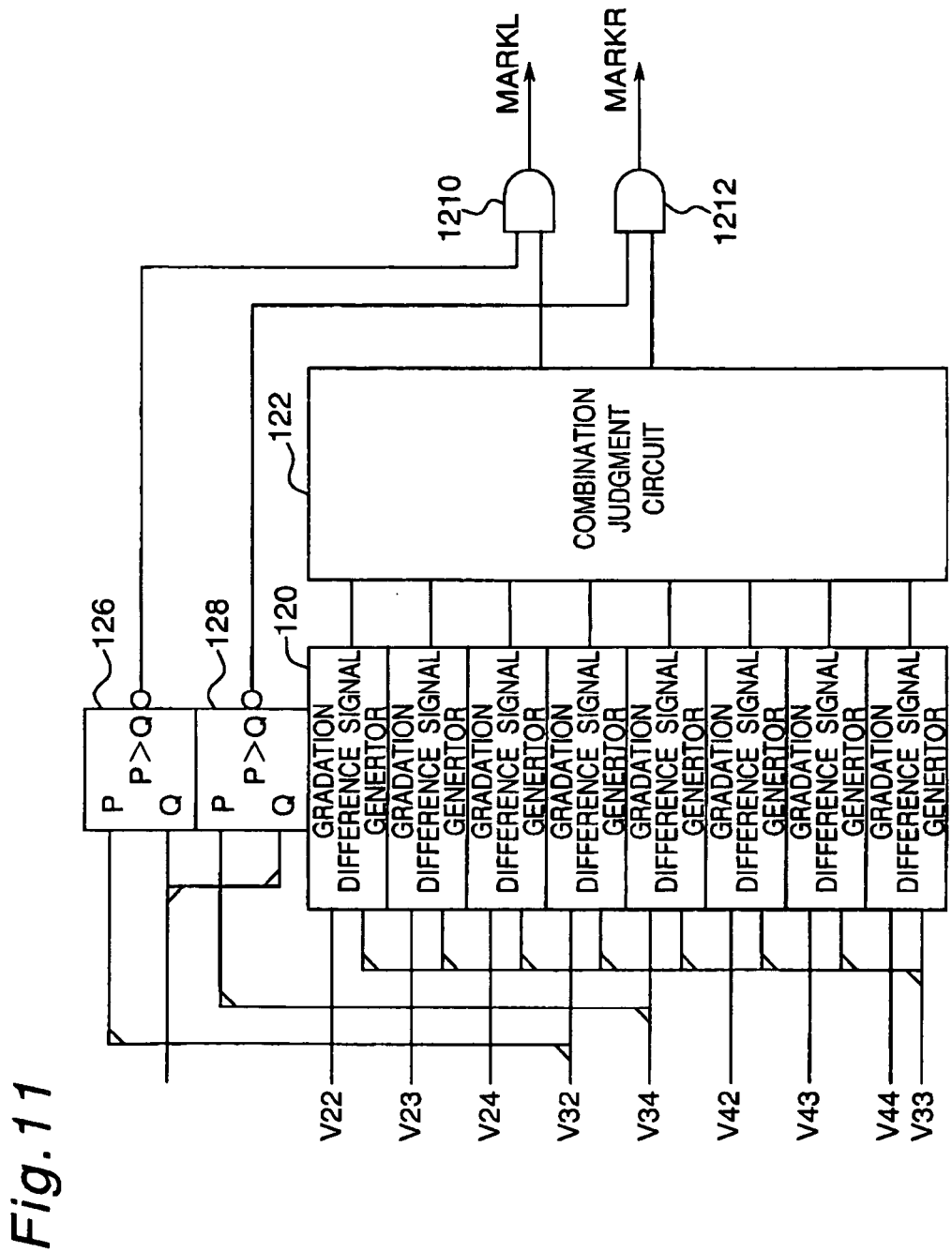
FIG. 11 is a block diagram that shows a portion of the edge judgment section in a modified example.

FIG. 11 shows a modified example of the edge judgment section. When a pixel adjacent to a target pixel on a side opposite to the edge direction has a density level higher than a threshold value, if the center of gravity in density is brought to one side in the target pixel, a white void portion tends to become conspicuous on the side which does not have the center of gravity in density. In such a case, the edge judgement section cancels the results of the edge discrimination so that the center of gravity in density is not allowed to change in the target pixel. The judgment is performed on the respective right and left sides.

The edge judgment section shown in FIG. 11 adds two comparators 126 and 128 and two AND gates 1210 and 1212 to the circuit shown in FIG. 2. For a left edge, the comparator 126 compares the signal V32 of the pixel on the left side of the target pixel with a threshold value, and the result of comparison is sent to the AND gate 1210 which also receives the left edge signal MARKL. Thus, when the signal V32 is larger than the threshold value, the left edge signal MARKL is not outputted, and the result of the edge discrimination is canceled. Similarly, for a right edge, the comparator 128 compares the signal V34 of the pixel on the right side of the target pixel with the threshold value, and the resulting of comparison is sent to thee AND gate 1212 which also receives the right edge signal MARKR. Thus, when the signal V34 is larger than the threshold value, the right edge signal MARKR is not outputted, and the results of the edge discrimination is canceled. Consequently, even when the pixel adjacent to the target pixel on a side opposite to the edge direction has a density level higher than the threshold value, the edge direction that has been discriminated is canceled. In this case, the density is controlled as a non-edge described above.

Figure 12:
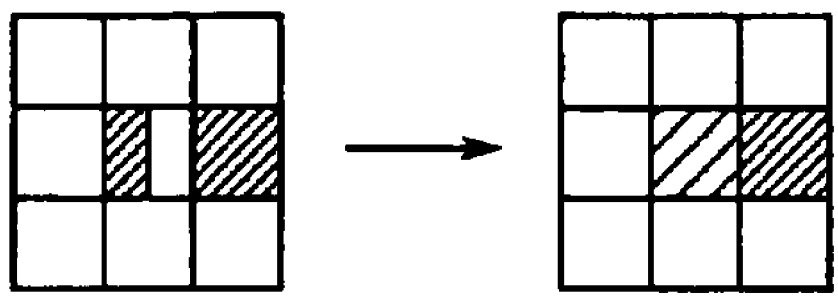
FIG. 12 is a diagram of an example which prevents void portions.

In an example shown in FIG. 12, a pixel at the center is discriminated as a right edge. However, if a pixel adjacent thereto on the right side has a density level higher than the threshold value, as shown on the left side, the result of the discrimination as the right edge is canceled. Then, as shown on the right side, a white void in the pixel at the center is prevented.

Figure 13:
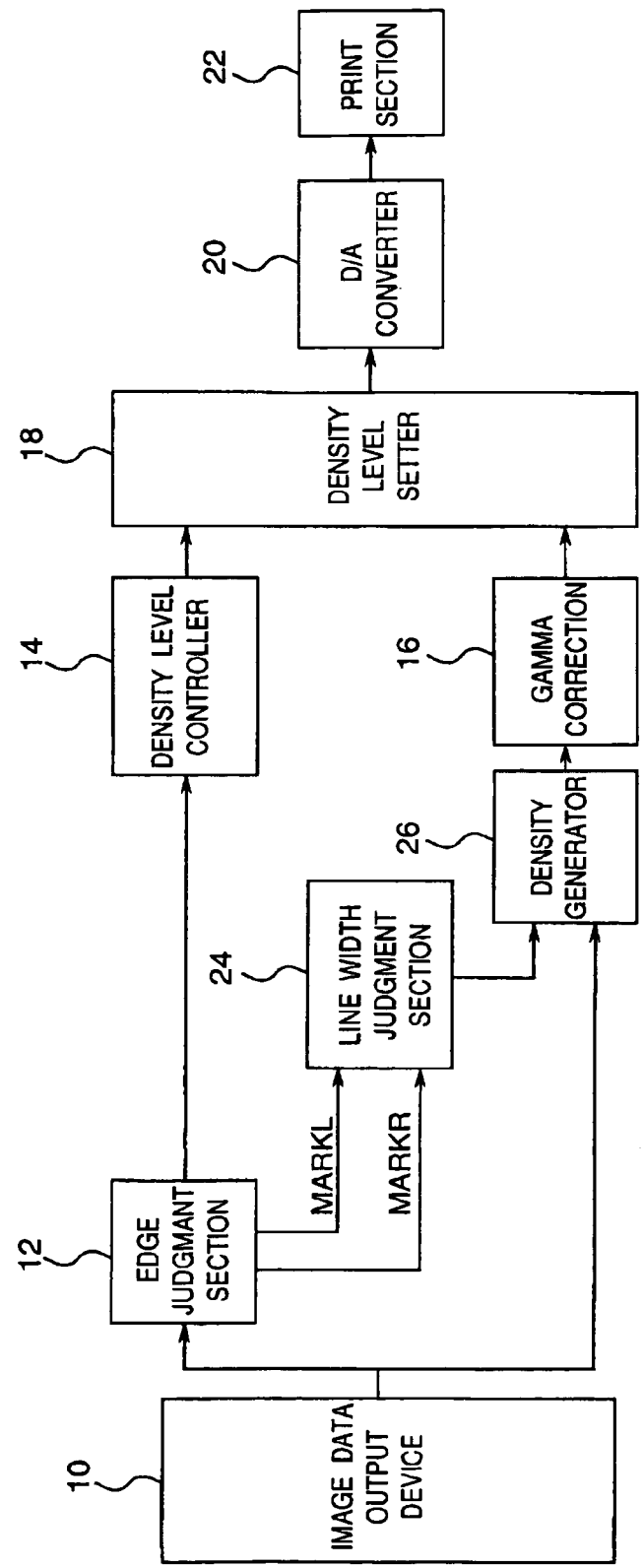
FIG. 13 is a block diagram of a second embodiment of an image processor.

FIG. 13 shows a second embodiment of the image processor of the present invention. The image processor generates multi-level digital image data in the unit of sub-pixel for printing for forming an image on a photoconductor by exposure, based upon bi-level digital image data received from an image reader, a host computer or the like. In order to process character edge portions, it determines differences in gradation between a target pixel and each of the adjacent pixels thereof and discriminates an edge direction in the main scan direction by using a combination of the differences in gradation, as in the image processor of the first embodiment. Then, it determines a line width of a line including the target pixel and switches an edge smoothing process according to the line width. This suppresses the occurrence of narrowing on a narrow edge portion on the edge smoothing.

More specifically, an image-data output device 10 outputs digital image data of a bi-level image received from an image reader, a host computer or the like (not shown) as 8-bit digital image data. An edge judgment section 12 determines differences in gradation between a target pixel and each of the adjacent pixels thereof based on the multi-level gradation data received from the image-data output device 10 so as to discriminate an edge direction in the main scan direction by using a combination of the differences in gradation. Then, based upon the discrimination of the edge judgment section 12, a density level controller 14 generates parameter signals for controlling the center of gravity in density in the pixel in the unit of sub-pixel. Then, a line width judgment section 24 judges a line width by using the edge direction discriminated by the edge judgment section 12. A density generator section 26 receives the multi-level gradation data of the target pixel and the adjacent pixels. Then, it newly generates the gradation (density) of the target pixel based upon the gradations of the adjacent pixels by using a smoothing process that corresponds to the line width judged by the line width judgment section 24. Thus, the gradation of the target pixel is re-calculated from the image data of the adjacent pixels. A gamma correction section 16 subjects the gradation data outputted from the density generation section 18 to non-linear conversion so as to correct the non-linearity in the gradation property in a print section 22. Next, on the data corrected by the gamma correction section 16, a density level setter 18 controls the density level by using the density control parameter signals generated by the density level controller circuit 14 so as to change the center of gravity in density in the pixel. Thus, the density is controlled by the density level controller 14 and the density level setter 18 in the unit of sub-pixel, and the data corrected by the gamma correction section 16 are further converted to digital gradation data for printing in the unit of sub-pixel. A D/A converter 20 converts the digital gradation data obtained by the density level setter 18 to an analog signal, which is outputted to a laser driver in the print section 22. The print section 22 modulates the intensity of a laser beam in the unit of sub-pixel in accordance with the input signal so that a half-tone image is formed on a recording medium with raster scan.

The edge judgment section 12 discriminates the edge direction EDG in the main scan direction of the target pixel in the four classifications of right edge, left edge, narrow edge and non-edge, and the density level controller 14 receives the edge direction signal EDG and outputs eight density control parameter signals A1, A2, A3, A4, B1, B2, B3 and B4 to the density level setter 18. They have the same structures as the counterparts in the first embodiment shown in FIGS. 2 and 4, and the explanation thereof is not repeated here.

Figure 14:
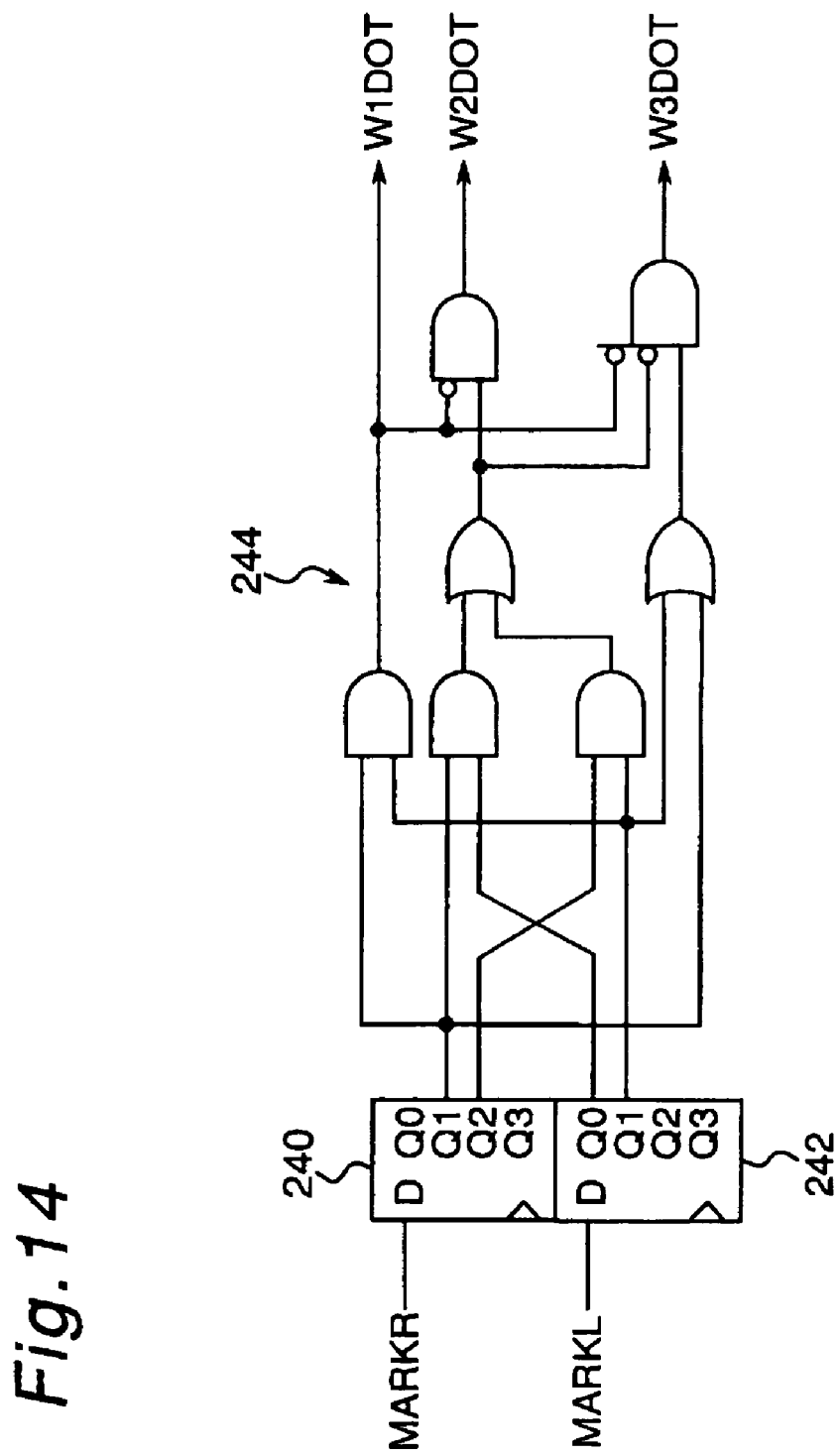
FIG. 14 is a block diagram that shows a line width judgment section.

FIG. 14 shows the line width judgment section 24. On an area consisting of a plurality of pixels including the target pixel, the line width judgment section 16 judges the continuity of the pixels according to the right edge signal MARKR and the left edge signal MARKL received from the edge judgement section 12 to classify the line widths into one-dot line (W1DOT), two-dots line (W2DOT) and wide line equal to or larger than three dots (W3DOT). In the line width judgment section 24, first, two shift registers 240 and 242 receive the right-edge signal MARKR and the left edge signal MARKL in the main scan direction, respectively. Then, they output the signals MARKR and MARKL for the target pixel and for pixels adjacent thereto on the two sides to a logical circuit 244 consisting of AND gates, OR gates, etc. When both of the MARKL and MARKR for the target pixel are inputted thereto, the logical circuit 164 judges the line width as "1-dot line width" and outputs the signal W1DOT. On the other hand, when the MARKL and the MARKR for the pixel preceding to the target pixel and for the target pixel, or for the target pixel and for the pixel succeeding to the target pixel, are successively inputted thereto, it judges the line width as "2-dots line width" and outputs the signal W2DOT. Further, when the MARKL or the MARKR is inputted thereto, it judges the line width as wide line width equal to or larger than three dots line and outputs the signal W3DOT.

Figure 15:
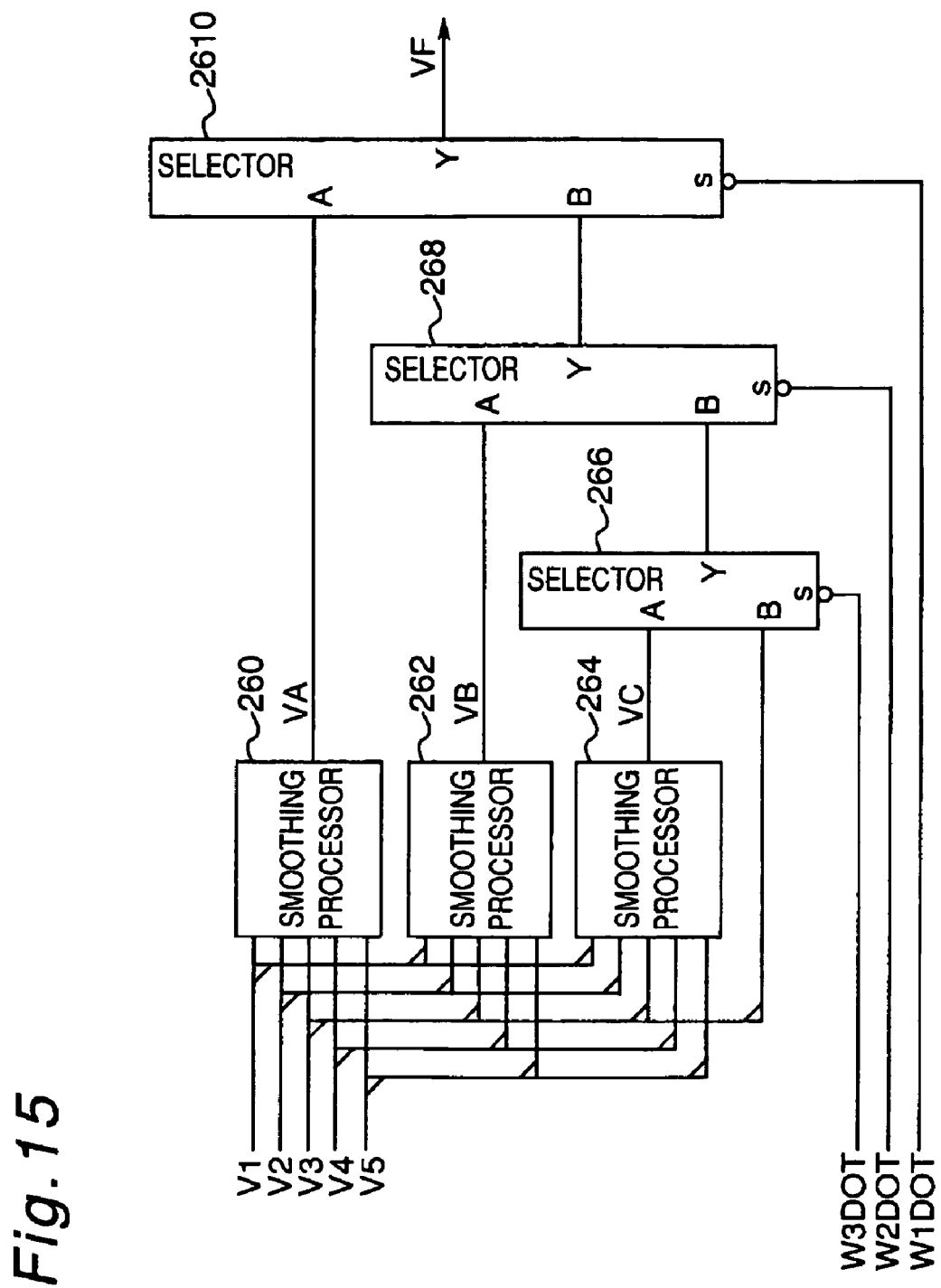
FIG. 15 is a block diagram of a density generator.

FIG. 15 shows the density generator 26. Three smoothing processors 260, 262 and 264 receive gradation data V3 of a line including a target pixel and gradation data V1, V2, V4 and V5 of two lines before and after the target pixel. The smoothing circuit 260 is used for 1-dot line. The smoothing circuit 262 is used for 2-dots line and include a switch for changing between an asymmetric filter and a symmetric filter. The smoothing circuit 264 is used for a line wider than two dots. When the signal W1DOT is received, a selector 266 outputs an output signal VA of the smoothing circuit 260 as a signal VF, and otherwise it outputs the output signal of a selector 268 as the signal VF. When the signal W2DOT is received, the selector 268 outputs an output signal VB of the smoothing circuit 262 as a density level, and otherwise it outputs an output signal of the selector 266 as the density level. When the signal W3DOT is received, the selector 268 outputs the output signal VC of the smoothing circuit 264 as a density level, and otherwise it outputs the signal V3 of the line including the target pixel. (The selectors 266, 268 and 2610 output an input "A" for a low level of the selection signal S.)

The density level setter 18 has the same structure as the counterpart in the first embodiment shown in FIG. 5, and explanation thereon is not repeated here.

The density variation in one pixel for each of the kinds of edges that have been discriminated by the edge judgment section 12 is similar to the counterpart shown in FIGS. 6 to 9, and explanation thereon is omitted here.

Figure 16:
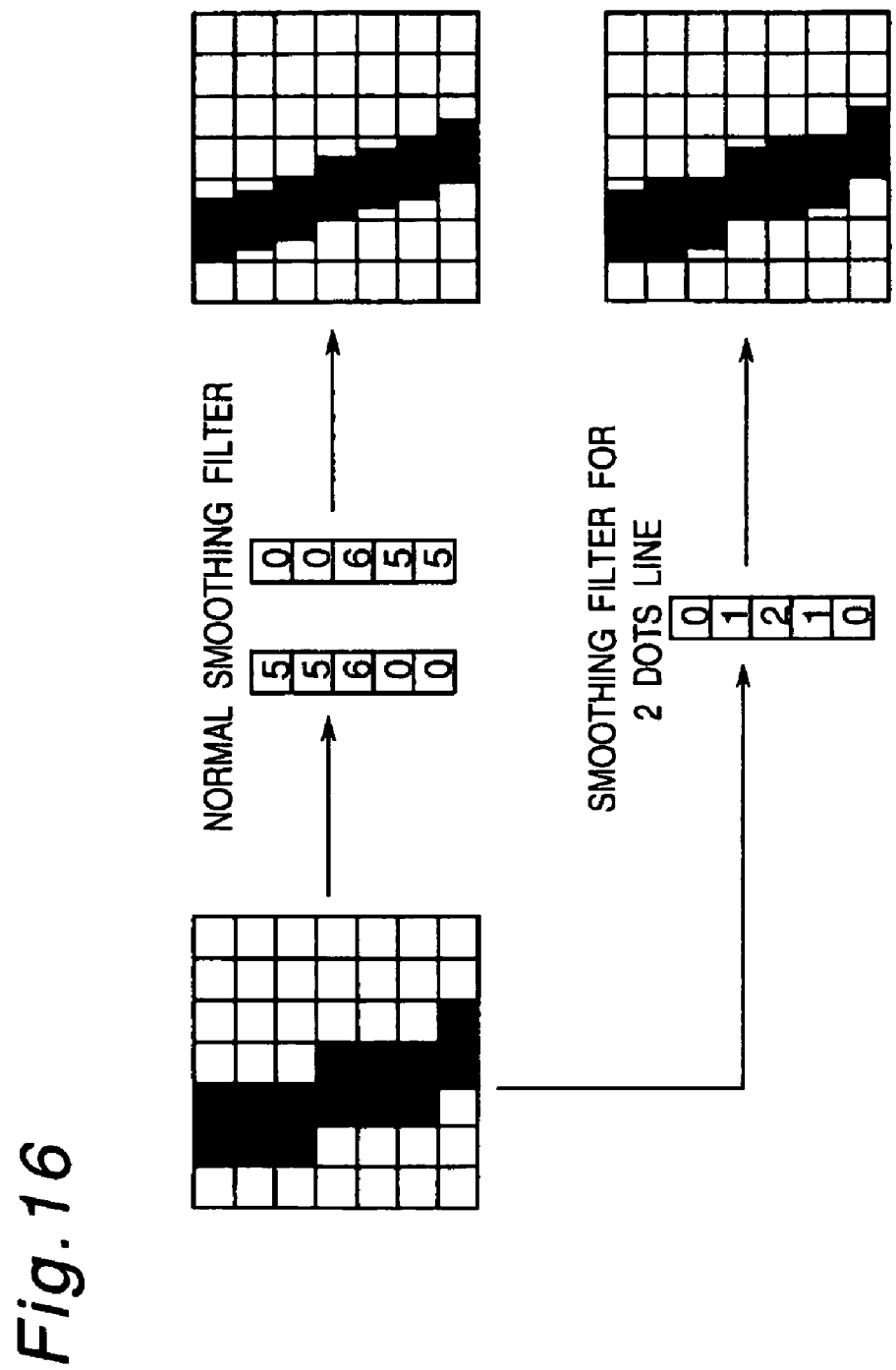
FIG. 16 is a diagram on an actual image data after smoothing.

FIG. 16 shows schematically an output image when a smoothing filter in the sub-scan direction is switched in accordance with the line width in the density generator section 26. Suppose that there is an original image as shown on the left side. A smoothing filter of an asymmetric type is normally used for a character edge portion in order to reproduce the edge. (Of the filters illustrated, the filter on the right is applied to a case in which an image is located above the center, and the filter on the left is applied to a case in which an image is located below the center.) When the asymmetric smoothing filter is applied to a line having a small line width, the line width in the image after subjected to the smoothing process and to the control process on the center of gravity in density in the unit of sub-pixel is extremely narrowed as compared with the original line width before the processing. In this example, the line having a width of two dots is reduced to a width of approximately 1.4 dots. As explained above, the smoothing filter used in the density level generator circuit is switched according to the line width, and the occurrence of narrowing of a narrow line can be suppressed by using a symmetrical filter.

On the other hand, as for a line having a width of two dots, when a filter of the symmetric type is used in the smoothing circuit in the density generator section 26, it is possible for a line having a small line width to reduce the occurrence of the narrowed line due to the smoothing process. In this example, the line having a width of two dots comes to have a line width of approximately 1.7 dots in the minimum, which is thicker and less narrowed as compared with the width of 1.4 dots in the comparative example.

Figure 17:
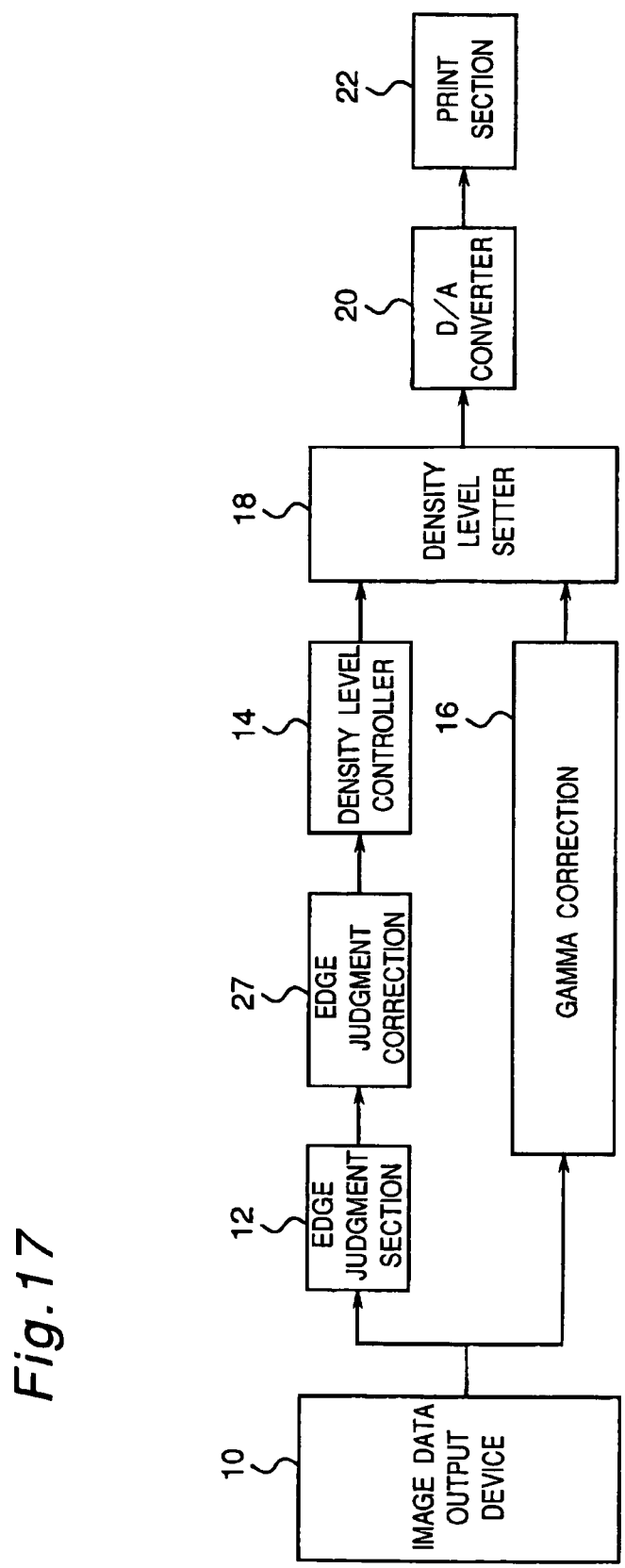
FIG. 17 is a block diagram of a third embodiment of an image processor.

FIG. 17 shows a third embodiment of the image processor of the present invention. The image processor generates digital image data for printing. It determines differences in gradation between a target pixel and each of the adjacent pixels, and discriminates an edge direction in the main scan direction according to a combination of the differences in gradation. Then, it changes the center of gravity of the density distribution in the target pixel in accordance with the discriminated edge direction, to smoothly reproduce the edge. In order to change the center of gravity in the density distribution in the target pixel, the density for the target pixel is changed in the unit of sub-pixel to control the density distribution in the target pixel.

More specifically, in the image processor, an image data output device 10 outputs digital image data received from an image reader, a host computer, or the like (not shown). In this embodiment, the image data is outputted as gradation data consisting of 8 bits per pixel. An edge judgment section 12 determines a difference in gradation between a target pixel and each of the adjacent pixels by using the gradation data received from the image data output device 10 and discriminates an edge direction in the main scan direction according to a combination of the differences in gradation. If the edge direction discriminated by the edge judgment section 12 is not appropriate, an edge judgment correction section 27 corrects the edge direction to an appropriate edge direction. According to the edge direction outputted from the edge judgment correction section 27, a density level controller section 14 generates parameter signals used for controlling the center of gravity in density in the pixel in the unit of sub-pixel. A density level controller 14 generates parameter signals for controlling the center of gravity in density in a pixel, according to the edge direction outputted from the edge judgment correction section 14. On the other hand, a gamma correction section 16 subjects the gradation data received from the image data output device 10 to nonlinear conversion to correct the nonlinearity in the gradation property in a print section 22. Next, a density level setter 18 controls the density level for the data corrected by the gamma correction section 16 according to the density control parameter signals generated by the density level controller 14 so as to change the center of gravity in density in the pixel. A D/A converter 20 converts the digital gradation data obtained by the density level setter 18 to an analog signal and outputs it to a laser driver in the print section 22. The print section 22 modulates the intensity of a laser beam in the unit of sub-pixel in accordance with the input data and forms a half-tone image on a recording medium in raster scan.

The edge judgment section 12 judges the edge direction in the main scan direction of the target pixel in the four classifications: "right edge, left edge, narrow edge, and non-edge. The structure of the edge judgment section 12 is similar to the counterpart in the first embodiment shown in FIG. 2, and explanation thereon is not repeated here.

Figure 18:
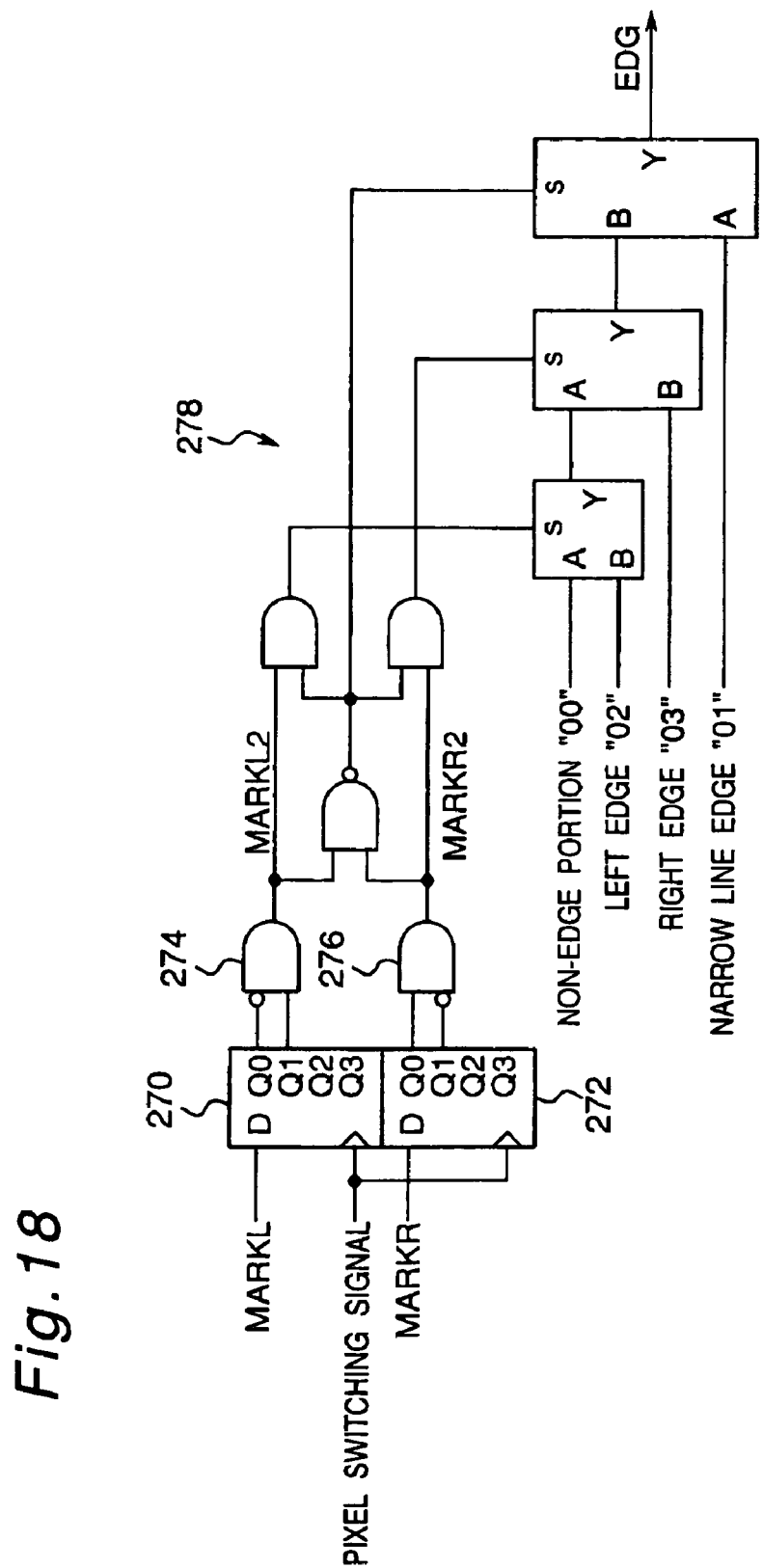
FIG. 18 is a block diagram of an edge judgment correction section.

FIG. 18 is a block diagram of the edge judgment correction section 27. In the edge judgment correction section 27, the right edging signal MARKR and the left edging signal MARKL for the main scan direction are received from the edge judgment section 12 to two shift registers 270 and 272. An AND gate 270 received left edge signal MARKL. However, it generates a new left edge signal MARKL2 when no left edge signal MARKL is received at the succeeding pixel although the left edge signal MARKL is outputted at the target pixel. Similarly, another AND gate 272 receives right edge signal MARKR. however, it generates a new right edge signal MARKR2 when no right edge signal MARKR is received at the succeeding pixel although the right edge signal MARKR is outputted at the target pixel. Then, it can be prevented that the right or left edge signal is continuously generated independently. Moreover, it is possible to always adopt an edge on the outside. By using the new right and left edge signals, MARKR2 and MARKL2, a logical circuit 278, which is the same as the logical gate 124 in the edge judgment section 12 shown in FIG. 2, generates an edge judgment signal EDG in the same manner.

The density level controller 14 and the density level setter 18 have similar structure as the counterparts in the first embodiment, and explanation thereon is not repeated here.

The density variation in a pixel for each of the four kinds of edges, right edge, left edge, non-edge and narrow edge, are similar to the counterpart in the first embodiment explained above with reference to FIGS. 6 to 9, and explanation thereon is not repeated here.

Figure 19:
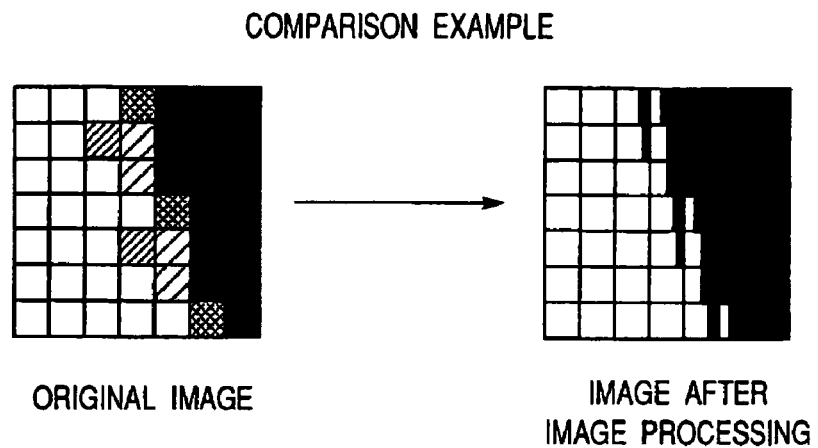
FIG. 19 is a drawing that shows actual image data after the process without using the edge judgment correction section.

FIG. 19 shows a comparison example of a reproduced image schematically when the edge judgment correction section 27 is not provided in the image processor. When an original image shown on the left side is processed, because the density level is set in the unit of sub-pixel at the edge portions, the center of gravity in density is shifted to the right. A reproduced image on the right side has duplicate edge portions.

Figure 20:
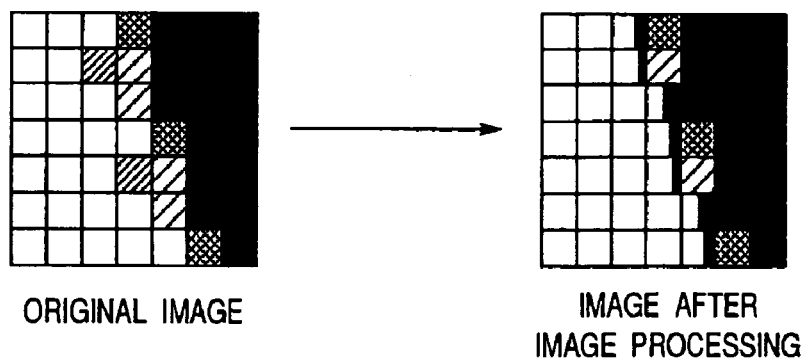
FIG. 20 is a drawing on actual image data after the process using the edge judgment correction section.

FIG. 20 shows an example of an actual reproduced image schematically when the edge judgment correction section 27 is provided in the image processor. When the same original image as in FIG. 19 shown on the right side is processed, pixels which have white voids shown in FIG. 19 are dealt as non-edge portions, and no density control in the unit of sub-pixel is carried out on these portions. This prevents the occurrence of duplicate edge portions or white voids.

Figure 21:
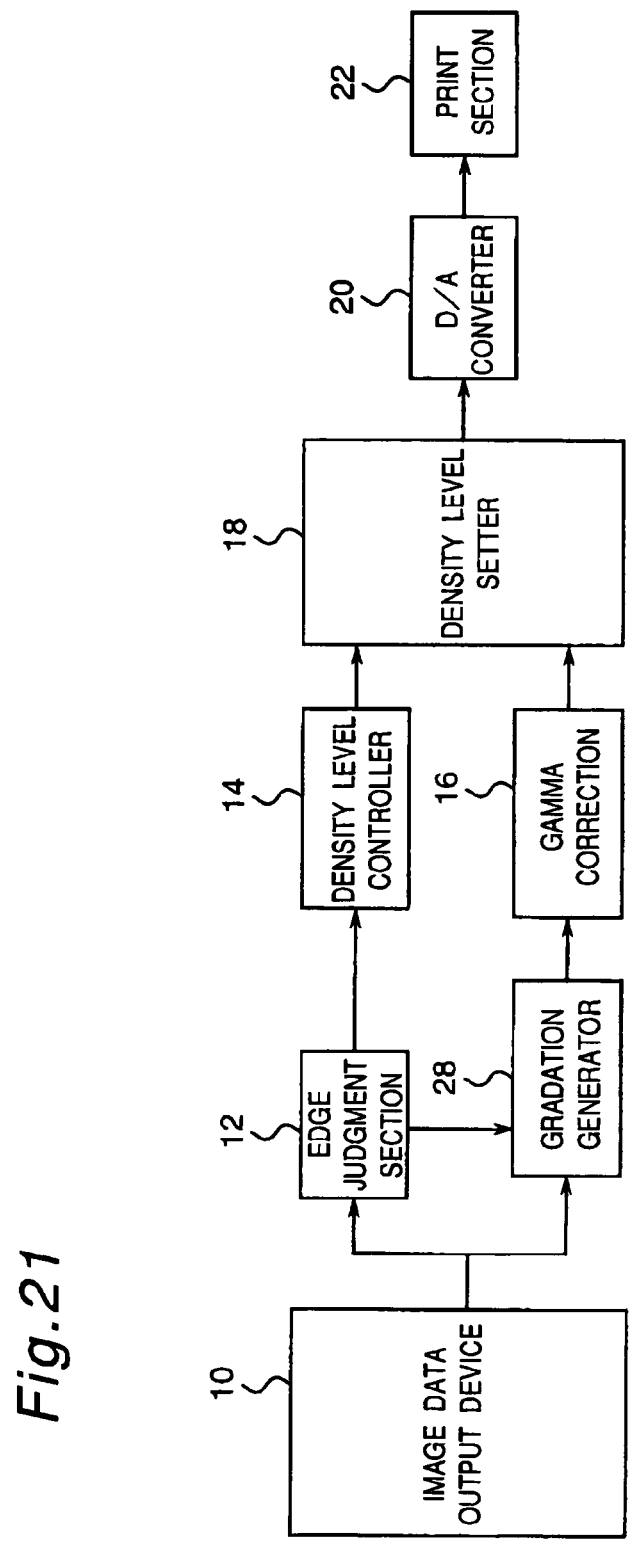
FIG. 21 is a block diagram of a fourth embodiment of an image processor.

FIG. 21 shows a fourth embodiment of the image processor of the present invention. Based upon digital image data received from an image reader, a host computer, or the like, the image processor generates digital image data for printing. The apparatus determines differences in gradation between a target pixel and each of the adjacent pixels and discriminates an edge direction in the main scan direction according to a combination of the differences in gradation. For a target pixel at an edge portion, the density level is calculated again by using a filter asymmetric in the sub-scan direction, while by taking the adjacent pixels into account. Thus, the center of gravity in density in a pixel is changed in accordance with the discriminated edge direction.

More specifically, an image-data output device 10 outputs digital image data received from a document reader, a host computer, or the like (not shown). The image data are outputted as gradation data consisting of 8 bits per pixel. An edge judgment section 12 determines differences in gradation between a target pixel and each of the adjacent pixels thereof by using the gradation data received from the image data output device 10 and discriminates an edge direction in the main scan direction according to a combination of the differences in gradation. Based upon the judgment by the edge judgment section 12, a density level controller 14 generates parameter signals for controlling the center of gravity in density in the pixel in the unit of sub-pixel. On the other hand, based upon the judgment by the edge judgment section 12, a gradation generator 28 generates new gradation data from the gradation data received from the image data output device 10. Then, a gamma correction section 16 subjects the gradation data received from the density generator 28 to nonlinear conversion so as to correct the nonlinearity in the gradation property in a print section 22. Next, a density level setter 18 receives the data corrected by the gamma correction section 16 and controls the density level by using the density control parameter signals generated by the density level controller 14, so as to change the center of gravity in density in the pixel. A D/A converter 20 converts the digital gradation data received from the density level setter 18 to an analog signal and outputs it to a laser driver in the print section 22. The print section 22 modulates the intensity of a laser beam in the unit of sub-pixel in accordance with the input signal so that a half-tone image is formed on a recording medium in raster scan.

The edge judgment section 12 discriminates the edge direction in the main scan direction of the target pixel in the four classifications: Right edge, left edge, narrow edge, and non-edge. The structure of the edge judgment section 12 is similar to the counterpart in the first embodiment shown in FIG. 2, and explanation thereon is not repeated here.

The density level controller 14 has a similar structure as the counterpart in the first embodiment, and explanation thereon is not repeated here.

Figure 22:
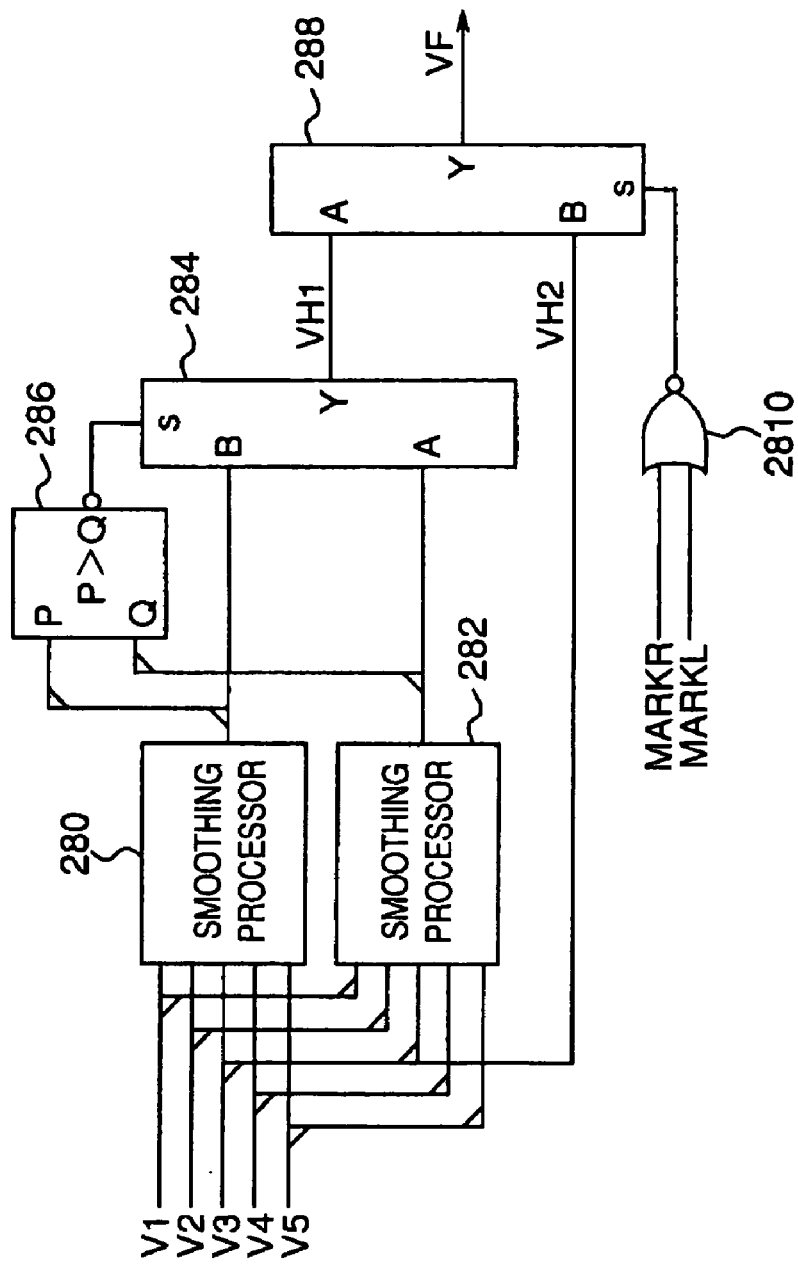
FIG. 22 is a block diagram of a density generator.

FIG. 22 shows the gradation generator 28. Here, image data (V3) of a line including the target pixel and other image data (V1, V2, V4 and V5) of two lines located before and after this line are inputted to two kinds of smoothing processors 280 and 282. The smoothing processors 280 and 282 send the results of the smoothing respectively to a first selector 284 and to a comparator 286. The first selector 284 selects either of the outputs in response to a selection signal from the comparator 286. The comparator 286 selects the smaller of the gradation values as the result of the smoothing processes and outputs it as a signal VH1. A second selector 288 selects either the output of the first selector 284 or the signal V3 (VH2) of the line containing the target pixel in response to a signal from a NOR gate 2810 to which MARKR and MARKL are inputted. Only in the case of edge, it outputs the output signal VH1 of the smoothing circuit 280, 282 as a gradation level VF, and otherwise it outputs the signal V3 (VH2) of the target pixel as the gradation level VF.

The density level setter 18 has a similar structure as the counterpart in the first embodiment, and explanation thereon is not repeated here.

The density variation in a pixel for each of the four kinds of edges, right edge, left edge, non-edge and narrow edge, are similar to the counterpart in the first embodiment explained above with reference to FIGS. 6 to 9, and explanation thereon is not repeated here.

Figure 23:
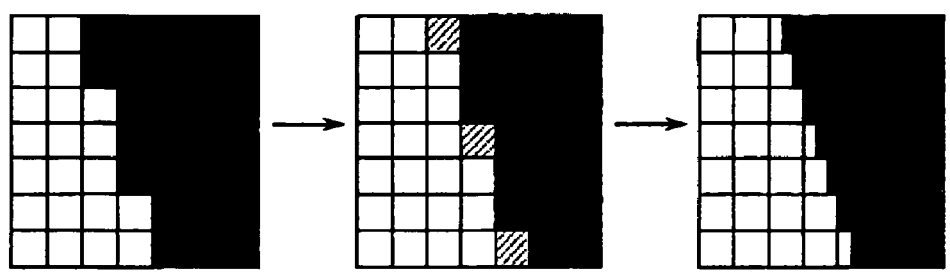
FIG. 23 is a diagram on one example of the results of the smoothing process.

FIG. 23 shows reproduction of edge portions during the smoothing process. An original image shown on the left side is a bi-level image. When this original image is smoothed, an image shown in the center is obtained. In this case, areas indicated with hatching represent a half-tone density levels between black and white. When this image is further processed on its center of gravity in density by using an asymmetric filter in the unit of sub-pixel, an image shown on the right side is obtained. This shows that the edge portions are smoothly represented.

Figure 24:
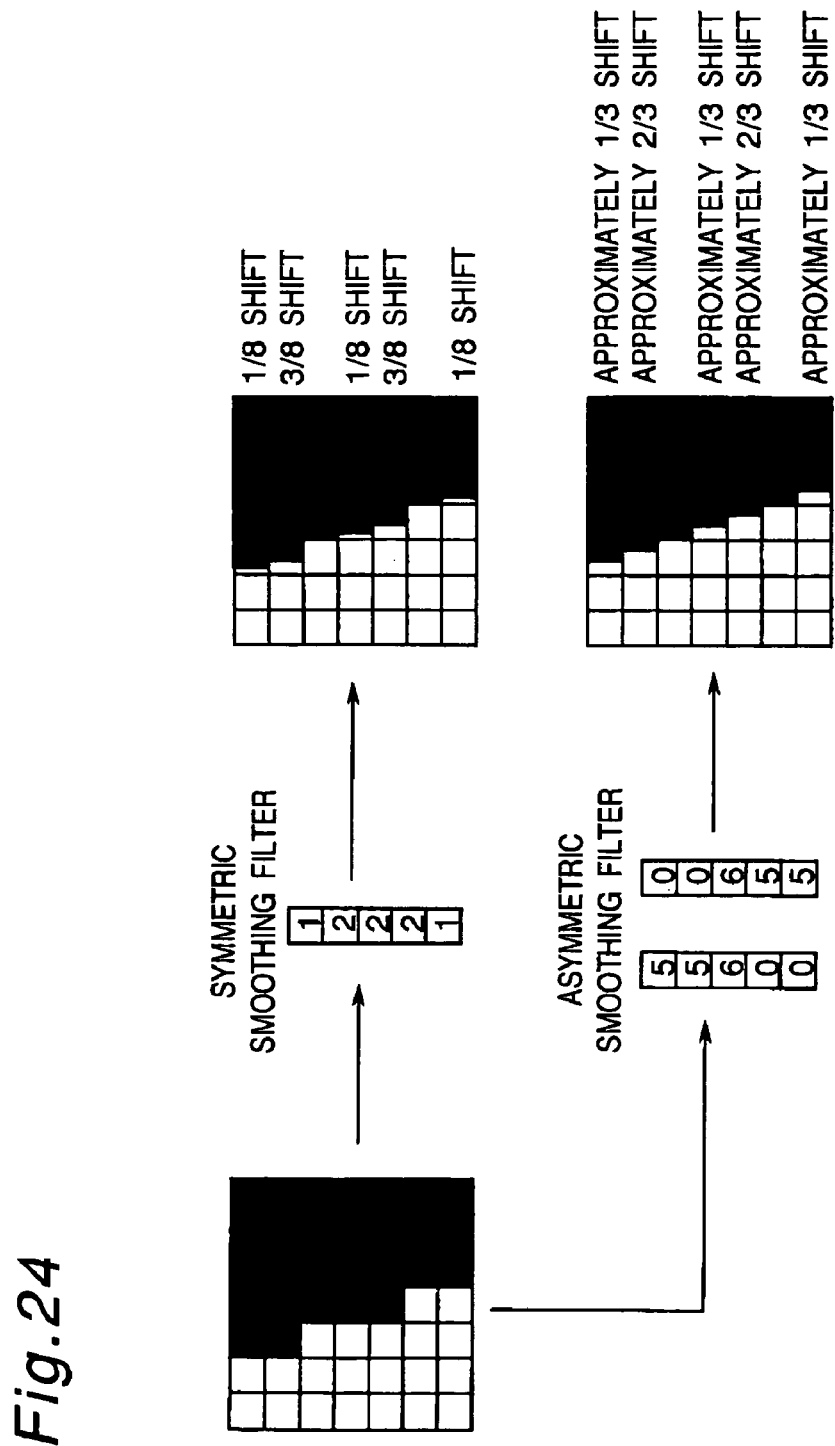
FIG. 24 is a diagram on an example of the results of the smoothing process in which an asymmetric filter is used.

FIG. 24 shows an advantage of respective smoothing processes when asymmetric filters are used and when a symmetric filter is used. When the symmetric filter is applied to the original image shown on the left side, an image shown right above is obtained. In this case, on the first pixel at the edge portion, the center of gravity in density is shifted to the right by ⅛, on the second pixel, it is shifted to the right by ⅜, and on the third pixel, it is not changed, and so on. In contrast, an image shown right below is obtained when two asymmetric filters are used for the original image by selecting the smaller of the two resulting gradation values. In this case, on the first pixel at the edge portion, the center of gravity in density is shifted to the right approximately by ⅓, on the second pixel, it is shifted approximately by ⅔, and on the third pixel, it is not changed, and so on. Thus, when asymmetric filters are used, the edge portions can be reproduced smoothly.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor which processes grayscale image data on density levels of pixels, comprising:
    an edge judgment circuit which discriminates an edge direction of a target pixel from differences in density level between the target pixel and adjacent pixels thereof based upon the grayscale image data; and
    a density level determining circuit which determines grayscale density levels in a plurality of sub-pixels in the target pixel, where the target pixel is divided into the sub-pixels, in accordance with the density level of the target pixel and the edge direction of the target pixel discriminated by the edge judgment circuit, wherein the density level determining circuit comprises:
    a density controller circuit which sets density-level setting parameters for each of the sub-pixels in the target pixel in accordance with the edge direction of the target pixel discriminated by said edge judgment circuit; and
    a density-level setter circuit which sets the density level of each of the plurality of sub-pixels in the target pixel based upon the density level of the target pixel by using the parameters set by said density controller circuit;

wherein the density level of the sub-pixels are determined by using a calculation for input gradation data with the parameters, the parameter for each pixel being determined based on the determined edge direction.

2. The image processor according to claim 1, wherein said edge judgment circuit discriminates a first edge which represents that an edge of a character image exists in a first direction relative to the target pixel, a second edge which represents that an edge of a character image exists in a second direction opposite to the first direction relative to the target pixel, and a narrow edge which represents that a character image exists at a center of the target pixel.

3. The image processor according to claim 1, wherein said edge judgment circuit cancels the discriminated edge direction when the density level of a pixel adjacent to the target pixel in the edge direction is larger than a threshold value.

4. The image processor according to claim 1, further comprising an edge judgment correction circuit connected to said edge judgment circuit and corrects the edge direction when the edge direction discriminated by said edge judgment circuit is not appropriate.

5. The image processor according to claim 4, wherein said density level determining circuit comprises:
 a density controller circuit which sets parameters for each of the sub-pixels based on the edge direction discriminated by said edge judgment circuit or by said edge judgment correction circuit; and
 a density-level setter circuit which sets a density level for each of a plurality of sub-regions in the target pixel based upon the density level of the target pixel by using the parameters set by said density controller circuit.

6. An image processor which processes grayscale image data on density levels of pixels, comprising:
 an edge judgment circuit which discriminates an edge direction of a target pixel from differences in density level between the target pixel and adjacent pixels thereof based upon the grayscale image data;
 a density level determining circuit which determines grayscale density levels in a plurality of sub-pixels in the target pixel, where the target pixel is divided into the sub-pixels, in accordance with the density level of the target pixel and the edge direction of the target pixel discriminated by the edge judgment circuit;
 a line width judgment circuit which determines a width of a line including the target pixel; and
 a smoothing circuit which performs smoothing on the image data of the target pixel and the adjacent pixels thereof in accordance to the line width determined by said line width judgment circuit and outputs the image data of the target pixel which have been smoothed;
 wherein the density level determining circuit determines the density levels in the plurality of sub-pixels in accordance with the density level of the target pixel subjected to smoothing by said smoothing circuit and the edge direction of the target pixel discriminated by the edge judgment circuit.

7. The image processor according to claim 6, wherein the density level determining circuit comprises:
 a density controller circuit which sets density-level setting parameters for each of the sub-pixels in the target pixel in accordance with the edge direction of the target pixel discriminated by said edge judgment circuit; and
 a density-level setter circuit which sets the density level of each of the plurality of sub-pixels in the target pixel based upon the density level of the target pixel by using the parameters set by said density controller circuit.

8. The image processor according to claim 7, wherein said line-width judgment circuit determines the line width of the line including the target pixel based upon the edge direction of the target pixel and those the adjacent pixels of the target pixel discriminated by the edge judgment circuit.

9. An image processor which processes grayscale image data on density levels of pixels, comprising:
 an edge judgment circuit which discriminates an edge direction of a target pixel from differences in density level between the target pixel and adjacent pixels thereof based upon the grayscale image data; and
 a density level determining circuit which determines grayscale density levels in a plurality of sub-pixels in the target pixel, where the target pixel is divided into the sub-pixels, in accordance with the density level of the target pixel and the edge direction of the target pixel discriminated by the edge judgment circuit;
 the image processor further comprising a smoothing circuit which performs smoothing on image data of the pixel, on which said edge judgment circuit discriminates an edge, by using an asymmetric filter having the target pixel at a center thereof, wherein said density level determining circuit determines density level of each of the sub-pixels in the target pixel based on the density level of the image data of the target pixel smoothed by said smoothing circuit and on the edge direction of the target pixel discriminated by said edge judgment circuit.

10. The image processor according to claim 9, wherein said density level determining circuit comprises:
 a density controller circuit which sets parameters for each of the sub-pixels based on the edge direction discriminated by said edge judgment circuit or by said edge judgment correction circuit; and
 a density-level setter circuit which sets a density level for each of a plurality of sub-regions in the target pixel based upon the density level of the target pixel smoothed by said smoothing circuit by using the parameters set by said density controller circuit.

11. The image processor according to claim 9, wherein said filter is asymmetrical with respect to a direction perpendicular to which a pixel is divided into sub-pixels.

12. The image processor according to claim 9, wherein said smoothing circuit comprises a plurality of filters and selects one of them for smoothing.

13. The image processor according to claim 9, wherein said smoothing circuit comprises a plurality of filters and selects one of the filters which provides a minimum density level of the target pixel after the smoothing carried by the filters.

14. A method for processing processes grayscale image data on density levels of pixels, where a pixel is divided into a plurality of sub-pixels, comprising the steps of:
 discriminating an edge direction of a target pixel from differences in density level between the target pixel and adjacent pixels thereof based upon the grayscale image data;
 determining grayscale density levels in a plurality of sub-pixels in the target pixel in accordance with the density level of the target pixel and the discriminated edge direction of the target pixel;
 setting density level setting parameters for each of the sub-pixels in the target pixel in accordance with the discriminated edge direction of the target pixel; and setting the density level of each of the plurality of sub-pixels in the target pixel based upon the density level of the target pixel by using the set parameters;

smoothing the image data of the pixel whose edge is discriminated, by using an asymmetric filter having a target pixel at a center thereof, and determining density level of each of the sub-pixels in the target pixel based on the density level of the image data of the target pixel smoothed and on the edge direction of the target pixel discriminated;

wherein the density level of the sub-pixels are determined by using a calculation for input gradation data with the parameters, the parameter for each pixel being determined based on the determined edge direction.

15. The method according to claim 14, further comprising the step of correcting the discriminated edge direction when the discriminated edge direction is not appropriate.

16. The method according to claim 14 further comprising the step of performing smoothing on image data of the pixel, on which an edge is discriminated, by using an asymmetric filter having the target pixel at a center thereof, wherein in said determining step density level of each of the sub-pixels in the target pixel is determined based on the density level of the smoothed image data of the target pixel and on the discriminated edge direction of the target pixel.

17. A method for processing processes grayscale image data on density levels of pixels, where a pixel is divided into a plurality of sub-pixels, comprising the steps of:

discriminating an edge direction of a target pixel from differences in density level between the target pixel and adjacent pixels thereof based upon the grayscale image data; and determining grayscale density levels in a plurality of sub-pixels in the target pixel in accordance with the density level of the target pixel and the discriminated edge direction of the target pixel;

determining a width of a line including the target pixel; and performing smoothing on the image data of the target pixel and the adjacent pixels thereof in accordance to the determined line width and outputting the image data of the target pixel which have been smoothed;

wherein an aid step of determining density levels ef determines the density levels in the plurality of sub-pixels in accordance with the density level of the target pixel subjected to smoothing and the discriminated edge direction of the target pixel.

18. An image processor which processes grayscale image data on density levels of pixels, comprising:

an edge judgment circuit which discriminates an edge direction of a target pixel from differences in density level between the target pixel and adjacent pixels thereof based upon the grayscale image data; and a density level determining circuit which determines density levels in a plurality of sub-pixels in the target pixel, where the target pixel is divided into the sub-pixels, in accordance with the density level of the target pixel and the edge direction of the target pixel discriminated by the edge judgment circuit;

wherein the density level determining circuit comprises:

a density controller circuit which sets density-level setting parameters for each of the sub-pixels in the target pixel in accordance with the edge direction of the target pixel discriminated by said edge judgment circuit; and a density-level setter circuit which sets the density level of each of the plurality of sub-pixels in the target pixel based upon the density level of the target pixel by using the parameters set by said density controller circuits a smoothing circuit which performs smoothing on image data of the pixel, on which said edge judgment circuit discriminates an edge, by using an asymmetric filter having the target pixel at a center thereof, wherein said density level determining circuit determines density level of each of the sub-pixels in the target pixel based on the density level of the image data of the target pixel smoothed by said smoothing circuit and on the edge direction of the target pixel discriminated by said edge judgment circuit;

wherein the density level of the sub-pixels are determined by using a calculation for input gradation data with the parameters, the parameter for each pixel being determined based on the determined edge direction.

19. An image processor which processes grayscale image data on density levels of pixels, comprising:

an edge judgment circuit which discriminates an edge direction of a target pixel from differences in density level between the target pixel and adjacent pixels thereof based upon the grayscale image data; and a density level determining circuit which determines density levels in a plurality of sub-pixels in the target pixel, where the target pixel is divided into the sub-pixels, in accordance with the density level of the target pixel and the edge direction of the target pixel discriminated by the edge judgment circuit;

wherein the density level determining circuit comprises:

a density controller circuit which sets density-level setting parameters for each of the sub-pixels in the target pixel in accordance with the edge direction of the target pixel discriminated by said edge judgment circuit; and a density-level setter circuit which sets the density level of each of the plurality of sub-pixels in the target pixel based upon the density level of the target pixel by using the parameters set by the density controller circuit;

a smoothing circuit which performs smoothing on image data of the pixel, on which said edge judgment circuit discriminates an edge, by using an asymmetric filter having the target pixel at a center thereof, wherein said density level determining circuit determines density level of each of the sub-pixels in the target pixel based on the density level of the image data of the target pixel smoothed by said smoothing circuit and on the edge direction of the target pixel discriminated by said edge judgment circuit;

wherein the density level of the sub-pixels are determined by using a calculation for input gradation data with the parameters, the parameter for each pixel being determined based on the determined edge direction; and wherein said edge judgment circuit cancels the discriminated edge direction when the density level of a pixel adjacent to the target pixel in the edge direction is larger than a threshold value.

* * * * *